United States Patent
Goold et al.

(10) Patent No.: US 9,458,907 B2
(45) Date of Patent: Oct. 4, 2016

(54) VIBRATION ISOLATION SYSTEMS INCLUDING MULTI-PARAMETER ISOLATORS PROVIDING PIEZOELECTRIC-BASED DAMPING

(71) Applicant: HONEYWELL INTERNATIONAL INC., Morristown, NJ (US)

(72) Inventors: Ryan Goold, Glendale, AZ (US);
Timothy Hindle, Peoria, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 79 days.

(21) Appl. No.: 14/505,334

(22) Filed: Oct. 2, 2014

(65) Prior Publication Data
US 2016/0097436 A1 Apr. 7, 2016

(51) Int. Cl.
*F16F 7/10* (2006.01)
*F16F 15/00* (2006.01)

(52) U.S. Cl.
CPC ........... *F16F 15/002* (2013.01); *F16F 15/007* (2013.01)

(58) Field of Classification Search
CPC ............ F16F 7/10; F16F 15/02; F16F 15/04; F16F 15/08; B60G 2202/25; B60G 2600/182
USPC ...... 188/136, 140.14, 140.15, 378; 248/550; 267/136, 140.14, 140.15
See application file for complete search history.

(56) References Cited

U.S. PATENT DOCUMENTS

| | | | |
|---|---|---|---|
| 5,660,255 A | 8/1997 | Schubert et al. | |
| 5,738,343 A * | 4/1998 | Nakajima | F16F 13/26 267/140.14 |
| 6,029,959 A | 2/2000 | Gran et al. | |
| 6,193,206 B1 | 2/2001 | Yasuda et al. | |
| 6,354,576 B1 | 3/2002 | Jacobs et al. | |
| 6,378,672 B1 | 4/2002 | Wakui | |
| 6,758,312 B2 | 7/2004 | Heiland | |
| 7,086,509 B2 | 8/2006 | Cunningham et al. | |
| 7,114,692 B2 | 10/2006 | Sun et al. | |
| 7,227,437 B2 | 6/2007 | Wang et al. | |
| 7,528,525 B2 | 5/2009 | Smith et al. | |
| 7,726,452 B2 | 6/2010 | Kraner | |
| 2008/0073820 A1 * | 3/2008 | Bendel | F16F 15/005 267/140.15 |
| 2009/0121399 A1 * | 5/2009 | Hindle | B64G 1/286 267/140.15 |

* cited by examiner

*Primary Examiner* — Christopher Schwartz
(74) *Attorney, Agent, or Firm* — Lorenz & Kopf, LLP

(57) ABSTRACT

Embodiments of a vibration isolation system are provided. In one embodiment, the vibration isolation system includes a first isolator having opposing mounting interfaces, a tuning spring disposed between the opposing mounting interfaces, and a piezoelectric actuator disposed between the opposing mounting interfaces and coupled in series with the tuning spring, as taken along a first load path through the first isolator. A controller is operably coupled to the piezoelectric actuator. During operation of the isolation system, the controller varies a control voltage supplied to the piezoelectric actuator to dampen vibrations transmitted through the first load path.

20 Claims, 4 Drawing Sheets

US 9,458,907 B2

VIBRATION ISOLATION SYSTEMS INCLUDING MULTI-PARAMETER ISOLATORS PROVIDING PIEZOELECTRIC-BASED DAMPING

TECHNICAL FIELD

The present invention relates generally to isolation devices and, more particularly, to active vibration isolation systems including multi-parameter isolators, which are controlled to provide piezoelectric-based damping.

BACKGROUND

Vibration isolation systems are employed in a variety of applications to minimize the transmission of disturbance forces between two bodies or structures. For example, satellites are often equipped with vibration isolation systems to minimize the transmission of vibratory forces emitted from attitude adjustment devices (e.g., control moment gyroscopes or reaction wheel arrays) to other vibration-sensitive components (e.g., optical payloads) carried by the satellite. The performance of a vibration isolation system is largely determined by the number of isolators included within the system, the manner in which the isolators are arranged, and the vibration attenuation characteristics of each individual isolator. Vibration isolation systems employing three parameter isolators, which behave mechanically as a primary spring in parallel with a series-coupled secondary spring and damper, provide superior attenuation of high frequency vibratory forces as compared to vibration isolation systems employing other types of passive isolators, such as viscoelastic dampers. An example of a three parameter isolator is the D-STRUT® isolator developed and commercially marketed by Honeywell, Inc., currently headquartered in Morristown, N.J. Such isolators are often passive, single Degree of Freedom (DOF), axially-damping devices well-suited for usage within multi-point mounting arrangements.

While providing the above-noted advantages, three parameter isolators remain limited in certain respects. Three parameter isolators are typically passive devices and, as such, generally cannot be tuned to provide broadband damping across a wide frequency range. This can be disadvantageous as multiple critical modes can exist over a broad frequency range and can vary over time with changing loads, imbalances, bearing imperfections, and the like. Similarly, the dynamic stiffness of a passive three parameter isolator is typically fixed by isolator design and by the viscosity of the selected damping fluid. By common design, three parameter isolators also include a sealed-bellows damper containing damping fluid, which can further limit isolator capabilities in a number of respects. The damping fluid can, for example, restrict the overall temperature capabilities of three parameter isolator, which may be undesirable when the isolator is utilized within an extremely hot or extremely cold (e.g., cryogenic) environment. While damping fluid temperature can be regulated through the usage of heaters and/or cooling circuits, this adds undesired cost, weight, and bulk to the isolator. Additionally, in applications wherein the isolator operates over a relatively broad temperature range, damping fluid viscosity changes can negatively impact isolator performance. A thermal compensation system can be utilized to maintain acceptable fluid operating pressures despite thermally-induced changes in damping fluid volume; however, this again adds undesired cost, weight, and bulk to the isolator. Finally, in the unlikely event of fluid leakage, the damping fluid can potentially contaminate sensitive equipment, such as optical sensors, positioned near the isolator.

It is thus desirable to provide embodiments of a vibration isolation system including multi-parameter isolators, which provide damping performance comparable to that provided by passive three parameter isolators, while also overcoming one or more of the limitations described above. It would be particularly desirable to provide embodiments of a vibration isolation system capable of actively adjusting its damping capabilities to, for example, target critical modes as they change over time and/or to provide different operational modes. It would also be desirable for such a vibration isolation system to overcome the above-noted drawbacks associated with fluid dampers to, for example, enable operation of the vibration isolation system at highly elevated or highly depressed (e.g., cryogenic) temperatures. Other desirable features and characteristics of embodiments of the present invention will become apparent from the subsequent Detailed Description and the appended Claims, taken in conjunction with the accompanying drawings and the foregoing Background.

BRIEF SUMMARY

Embodiments of a vibration isolation system are provided. In one embodiment, the isolation system includes a first isolator having opposing mounting interfaces, a tuning spring disposed between the opposing mounting interfaces, and a piezoelectric actuator disposed between the opposing mounting interfaces and coupled in series with the tuning spring, as taken along a first load path through the first isolator. A controller is operably coupled to the piezoelectric actuator. During operation of the isolation system, the controller varies a control voltage supplied to the piezoelectric actuator to dampen vibrations transmitted through the first load path.

In a further embodiment, the isolation system includes a first isolator having opposing mounting interfaces, a tuning spring disposed between the opposing mounting interfaces, and a piezoelectric actuator disposed between the opposing mounting interfaces and coupled in series with the tuning spring, as taken along a first load path through the first isolator. A first sensor, such as a load cell, is coupled to the first isolator and configured to measure the force applied across the first load path. One or more additional sensors, such as a displacement sensor or a pair of accelerometers, are coupled to the first isolator and configured to measure the relative rate or relative displacement across the opposing mounting interfaces. A controller is operably coupled to the piezoelectric actuator, to the first sensor, and to the one or more additional sensors. The controller is configured to vary a control voltage supplied to the piezoelectric actuator in response to signals received from the first sensor and the one or more additional sensors during operation of the isolation system.

Embodiments of an isolator are further provided. In one embodiment, the isolator includes opposing mounting interfaces, a tuning spring disposed between the opposing mounting interfaces, and a piezoelectric actuator disposed between the opposing mounting interfaces and coupled in series with the tuning spring, as taken along a first load path through the first isolator. In certain embodiments, the piezoelectric actuator may have a stiffness at least 100 times greater than the stiffness of the tuning spring, as taken along the first load path. In other embodiments, the isolator may further include a main spring between the opposing mounting interfaces and coupled in parallel with the tuning spring and piezoelectric actuator. In such embodiments, a load cell may further be coupled in series with the main spring, the tuning spring, and the piezoelectric actuator.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description.

Figure 1:
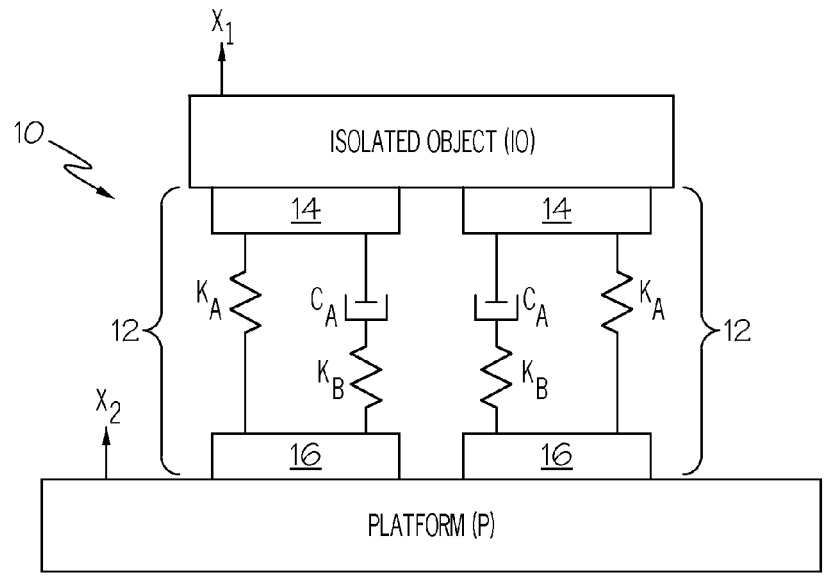
FIG. 1 is a schematic of a multi-point vibration isolation system including a number of passive three parameter isolators disposed between two structures, as illustrated in accordance with the teachings of prior art.

FIG. 1 is a schematic representation of a multi-point vibration isolation system 10, which includes a number of passive three parameter isolators 12 disposed between two structures, as illustrated in accordance with the teachings of prior art. In the illustrated schematic, isolation system 10 is shown as including two isolators 12; however, it will be appreciated that this is for convenience of illustration and that isolation system 10 will typically include a greater number of isolators. Isolation system 10 and, more specifically, three parameter isolators 12 are mechanically coupled between an isolated object "IO" and a platform "P." Isolated object IO can be any payload, device, or structure supported by platform P and regardless of whether it is desired to attenuate vibrations transmitted from platform P to the isolated object IO, from the isolated object IO to platform P, or to provide bidirectional vibration attenuation. In one embodiment, platform P is a satellite or other spacecraft, while isolated object IO is an optical bench or other vibration-sensitive payload carried by the spacecraft. In another embodiment, platform P is an aircraft and isolated object IO is a gas turbine engine, which generates vibrations that are desirably attenuated prior to reaching the aircraft fuselage. The foregoing examples are provided by way of non-limiting example only and with the understanding that vibration isolation system 10 (and vibration isolation system 30 described below in conjunction with FIG. 3) can separate any structures or objects between which vibration isolation is desired.

Three parameter isolator 12 each include opposing mounting interfaces 14 and 16, which are mounted to isolated object IO and to platform P, respectively. Mounting interfaces 14 and 16 can be joined to isolated object IO and platform P utilizing mechanical means (e.g., brackets), permanent joinder means (e.g., welding), or in another manner. As modeled in FIG. 1, each three parameter isolator 12 further includes the following mechanical elements or components: (i) a first spring component $K_A$, which is mechanically coupled between opposing mounting interfaces 14 and 16; (ii) a second spring component $K_B$, which is mechanically coupled between isolated object IO and platform P in parallel with first spring component $K_A$; and (iii) a damper $C_A$, which is mechanically coupled between isolated object IO and platform P in parallel with the first spring component $K_A$ and in series with the second spring component $K_B$. As symbolically indicated in FIG. 1, each damper $C_A$ is a fluid damper implemented as, for example, at least two internally- or externally-pressurized metal bellows. The movement of mounting interfaces 14 and 16, as taken along the working axes of isolators 12, is further represented in FIG. 1 by arrows $X_1$ and $X_2$, respectively. The ideal three parameter transfer function of three parameter isolators 12 is expressed in the Laplace domain by the following equation:

$$\frac{F}{X_R}(s) = \frac{(K_A + K_B)C_A s + K_A K_B}{C_A s + K_B} \quad \text{EQ. 1}$$

wherein F is the force or load applied across isolators 12, $X_R$ is the relative displacement between the isolator ends or mounting interfaces (the difference between $X_1$ and $X_2$ in FIG. 1), $K_A$ is the spring rate of the first spring component, $K_B$ is the spring rate of the second spring component, and $C_A$ is the coefficient of the damper component.

Figure 2:
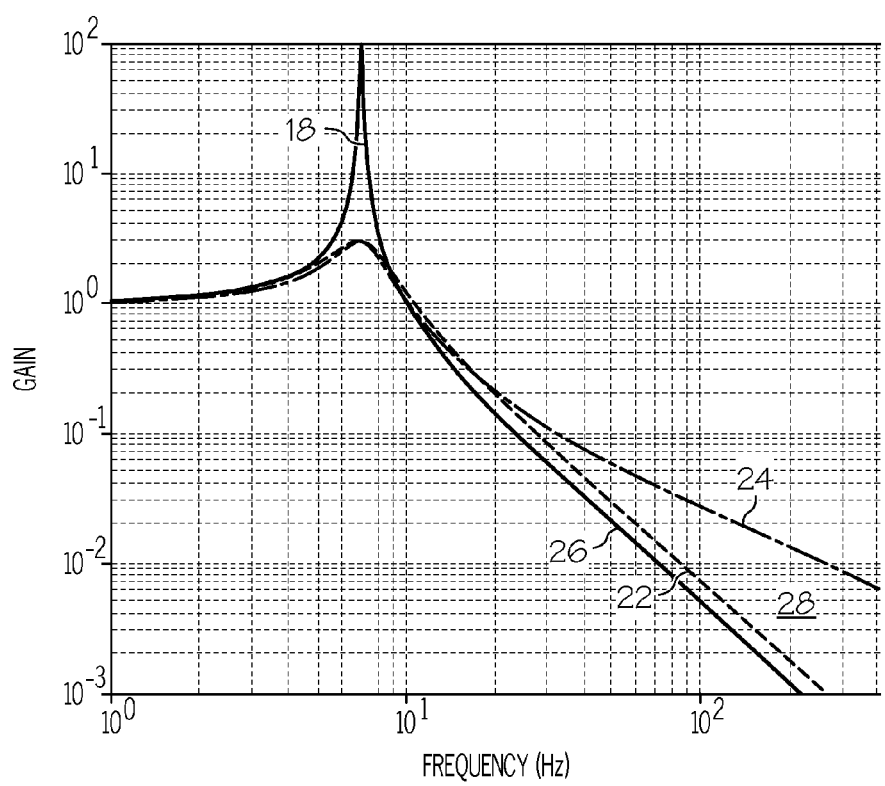
FIG. 2 is a transmissibility plot of frequency (horizontal axis) versus gain (vertical axis) illustrating the transmissibility profile of one of the three parameter isolators shown in FIG. 1 as compared to the transmissibility profiles of a two parameter isolator and an undamped device.

FIG. 2 is a transmissibility plot illustrating the damping characteristics of one of three parameter isolators 12 (curve 22) as compared to a two parameter isolator (curve 24) and an undamped device (curve 26). As indicated in FIG. 2 at 18, the undamped device (curve 26) provides a relatively high peak gain at a threshold frequency, which, in the illustrated example, is moderately less than 10 hertz. By comparison, the two parameter device (curve 24) provides a significantly lower peak gain at the threshold frequency, but an undesirably gradual decrease in gain with increasing frequency after the threshold frequency has been surpassed (referred to as "roll-off"). In the illustrated example, the roll-off of the two parameter device (curve 24) is approximately 20 decibel per decade ("dB/decade"). Lastly, the three parameter device (curve 22) provides a low peak gain substantially equivalent to that achieved by the two parameter device (curve 24) and further provides a relatively steep roll-off of about 40 dB/decade. The three parameter device (curve 22) thus provides a significantly lower transmissibility at higher frequencies, as quantified in FIG. 2 by the area 28 bounded by curves 22 and 24. By way of non-limiting example, further discussion of three parameter isolators can be found in U.S. Pat. No. 5,332,070, entitled "THREE PARAMETER VISCOUS DAMPER AND ISOLATOR," issued Jan. 26, 1994; and U.S. Pat. No. 7,182,188 B2, entitled "ISOLATOR USING EXTERNALLY PRESSURIZED SEALING BEL- LOWS," issued Feb. 27, 2007; both of which are assigned to assignee of the instant Application and are hereby incorporated by reference.

Three parameter isolators 12 (FIG. 1) thus provides superior damping characteristics (i.e., a lower overall transmissibility) as compared to undamped devices and two parameter devices over a given frequency range. However, as noted in the foregoing section entitled "BACKGROUND," passive three parameter isolators remain limited in certain respects. For example, while a three parameter isolator can be tuned to provide peak damping at a frequency corresponding to a targeted critical mode, the passive three parameter isolator will provide less-than-optimal damping at other operational frequencies at which other critical or rigid body modes occur. The dynamic stiffness of a passive three parameter isolator is typically fixed and, thus, cannot be adjusted during isolator operation to accommodate isolator operation in highly disparate environments. Additionally, conventional three parameter isolators typically rely on a fluid dampers to provide the desired damping effect ($C_A$); however, the presence of damping fluid within the isolator can impose still further limitations. For example, and as also noted above, the damping fluid can limit the operational temperature range of three parameter isolator, which can be problematic when mission requirements demand exposure to extremely hot and/or extremely cold (e.g., cryogenic) temperatures. The presence of damping fluid within the isolator can also require the inclusion a thermal compensator to offset thermally-induced changes in damping fluid volume and may raise concerns regarding sensor contamination due to damping fluid leakage.

The following describes embodiments of a vibration isolation system including multi-parameter isolators, which are controlled to provide piezoelectric-based damping. The isolators are referred to herein as "multi-parameter" to indicate that that the isolators include, at minimum, a first or tuning spring coupled in series with a piezoelectric actuator, as taken along a load path through the isolator. During operation of the isolation system, a controller varies a control voltage supplied to the piezoelectric actuator to dampen vibrations transmitted through the isolator. In this manner, the piezoelectric actuator is controlled to provide the desired damping effect ($C_A$), while the above-noted limitations associated with fluid dampers are avoided. Specifically, the temperature capabilities of the isolators and, thus, the isolation system can be increased, while the need for thermal compensation devices can be eliminated to minimize isolator size and weight. Furthermore, as the piezoelectric actuator is actively controlled, the vibration isolation can adjust its damping capabilities in-situ to, for example, target critical modes as they change over time and/or to provide different operational modes suited for different environments (e.g., on-launch and in-orbit operational modes). The tuning spring, which is coupled in series with the piezoelectric damper, can be wholly or at least predominately determinative of $K_B$ and provides compliancy in the unlikely event of actuator failure or if the control system bandwidth should be exceeded. Stated differently, the piezoelectric damper can be actively controlled to determine the $K_A$ value in conjunction with the series-coupled tuning spring. In certain embodiments, the isolators may lack a discrete main spring, in which case the piezoelectric actuator can further be controlled to determine $K_A$, $K_B$, and $C_A$ in the ideal three parameter transfer function (EQ. 1) set-forth above. Alternatively, each isolator can be produced to further include a second or main spring, which is wholly or at least predominately determinative of $K_A$. In such embodiments, the piezoelectric actuator need only provide the desired damping effect ($C_A$), which may help simplify the control architecture of the vibration isolation system.

In many embodiments, the piezoelectric damper is controlled to provide a "de-stroke" function and thereby effectively soften the series stiffness of the isolator during operation. By controlling the piezoelectric damper to "de-stroke" in this manner, the controller can achieve the desired $K_A$ value within the stroke limitations of the piezoelectric damper. If the controller bandwidth should be exceeded under high frequency operating conditions, the piezoelectric damper may no longer stroke and become highly stiff. In such instances, the tuning spring may then be predominately or exclusively determinatively $K_B$. If the isolator is further produced to include a primary or main spring in addition to the piezoelectric damper and the tuning spring, the main spring will typically be predominately determinative of the $K_A$ value. In this case, the piezoelectric damper can be controlled to exclusively provide the desired damping effect such that the force applied by the damper is, for example, $F=-C_A*$relative velocity. As previously indicated, such an isolator architecture (wherein the isolator is produced to include a main spring in parallel with a series-coupled tuning spring and piezoelectric damper) can help simplify the active control scheme. An example of an active vibration isolation systems including piezoelectric actuators will now be described in conjunction with FIG. 3.

Figure 3:
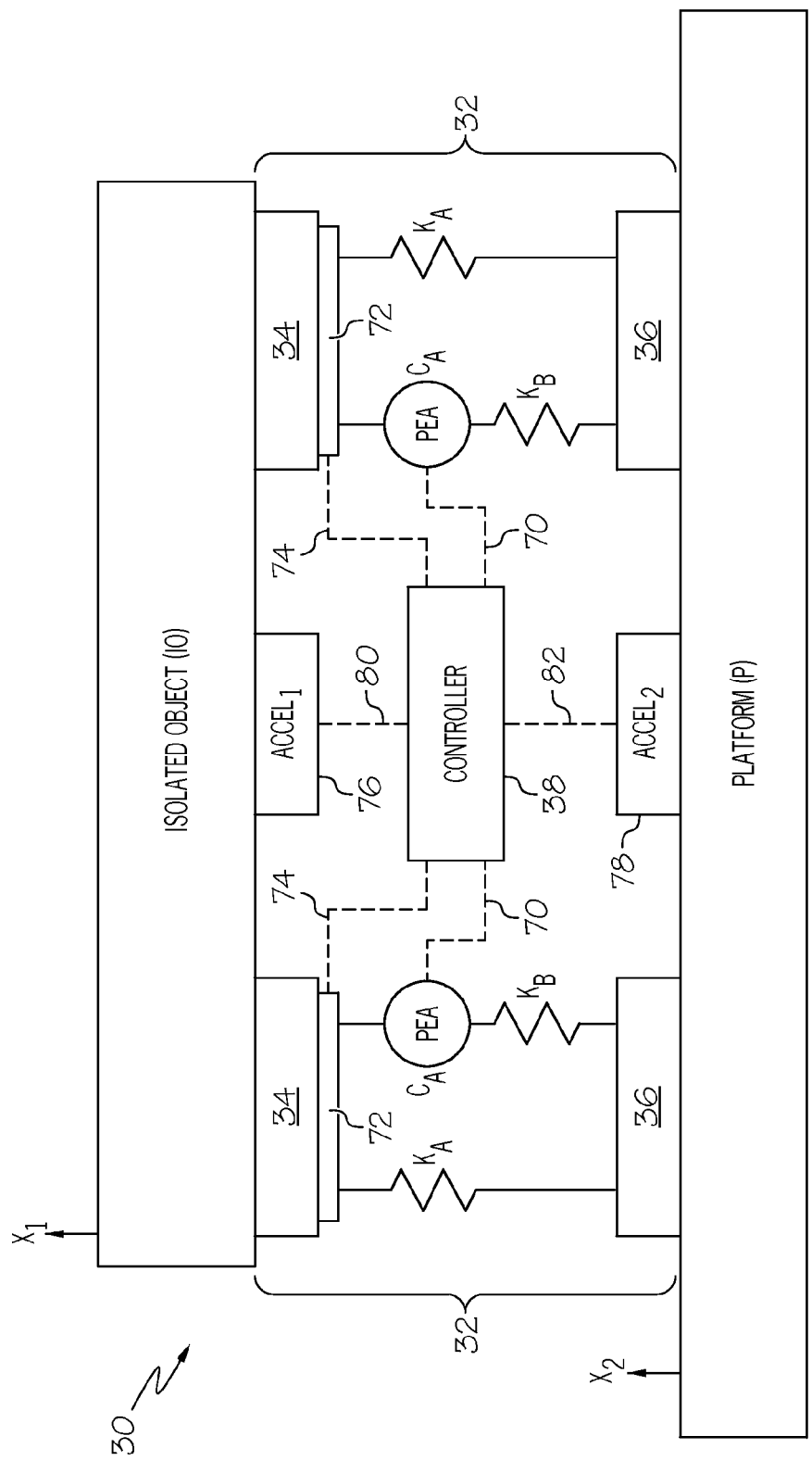
FIG. 3 is a schematic of a multi-point isolation system including a number of multi-parameter isolators, which provide piezoelectric-based damping in accordance with commands received from a controller, as illustrated in accordance with an exemplary embodiment of the present invention.

FIG. 3 is a schematic representation of an active multi-point isolation system 30, as illustrated in accordance with an exemplary embodiment of the present invention. Active vibration isolation system 30 includes a number of multi-parameter isolators 32, which are positioned between an isolated object IO and a platform P. Specifically, each isolator 32 includes opposing mounting interfaces 34 and 36, which are mounted or attached to isolated object IO and platform P, respectively. Any suitable attachment hardware (e.g., brackets and fasteners) or other attachment means (e.g., welding, soldering, or bonding) may be utilized to provide the desired connections. Isolated object IO and platform P can assume the form of any structures or objects between which vibration attenuation is desired including, but not limited to, the examples discussed above in conjunction with FIG. 1. Although only two isolators 32 are shown in FIG. 3, it will be appreciated that isolation system 30 can include any number of isolators greater than one. In preferred embodiments, isolation system 30 includes a sufficient number of isolators to provide high fidelity damping between isolated object IO and a platform P in six degrees of freedom ("6-DOF"). For example, in certain embodiments, isolation system 30 can include six isolators 32 positioned in a hexapod (Stewart platform) mounting arrangement or eight isolators 32 positioned in an over-constrained octopod mounting arrangement.

As was the case with passive three parameter isolators 12 shown in FIG. 1, isolators 32 can be modeled to include a main spring component $K_A$ and a tuning spring component $K_B$, which are coupled in parallel between mounting interfaces 34 and 36 and, more generally, between isolated object IO and platform P. However, in contrast to isolators 12 (FIG. 1), isolators 32 each include a piezoelectric actuator PEA in place of a conventional fluid-containing damper, such as a sealed metal bellows damper. Thus, for each isolator 32, piezoelectric actuator PEA is coupled in series with tuning spring component $K_B$ and in parallel with main spring component $K_A$. A controller 38 is operably coupled to piezoelectric actuators PEAs and, during operation of isolation system 30, varies control voltages supplied thereto to provide damping utilizing piezoelectric actuators PEA (as indicated in FIG. 3 by label $C_A$). When controlled in this manner, piezoelectric actuators PEAs effectively serve as solid state dampers that can (but need not always) provide damping properties similar to those provided by a sealed-bellows damper conventionally utilized passive three parameter isolators, but without reliance upon damping fluid. Exemplary manners in which piezoelectric actuators PEA can be controlled by controller 38 are described in more detail below in conjunction with FIG. 5. First, however, an example of a manner in which isolators 32 can be physically implemented is described below in conjunction with FIG. 4.

Figure 4:
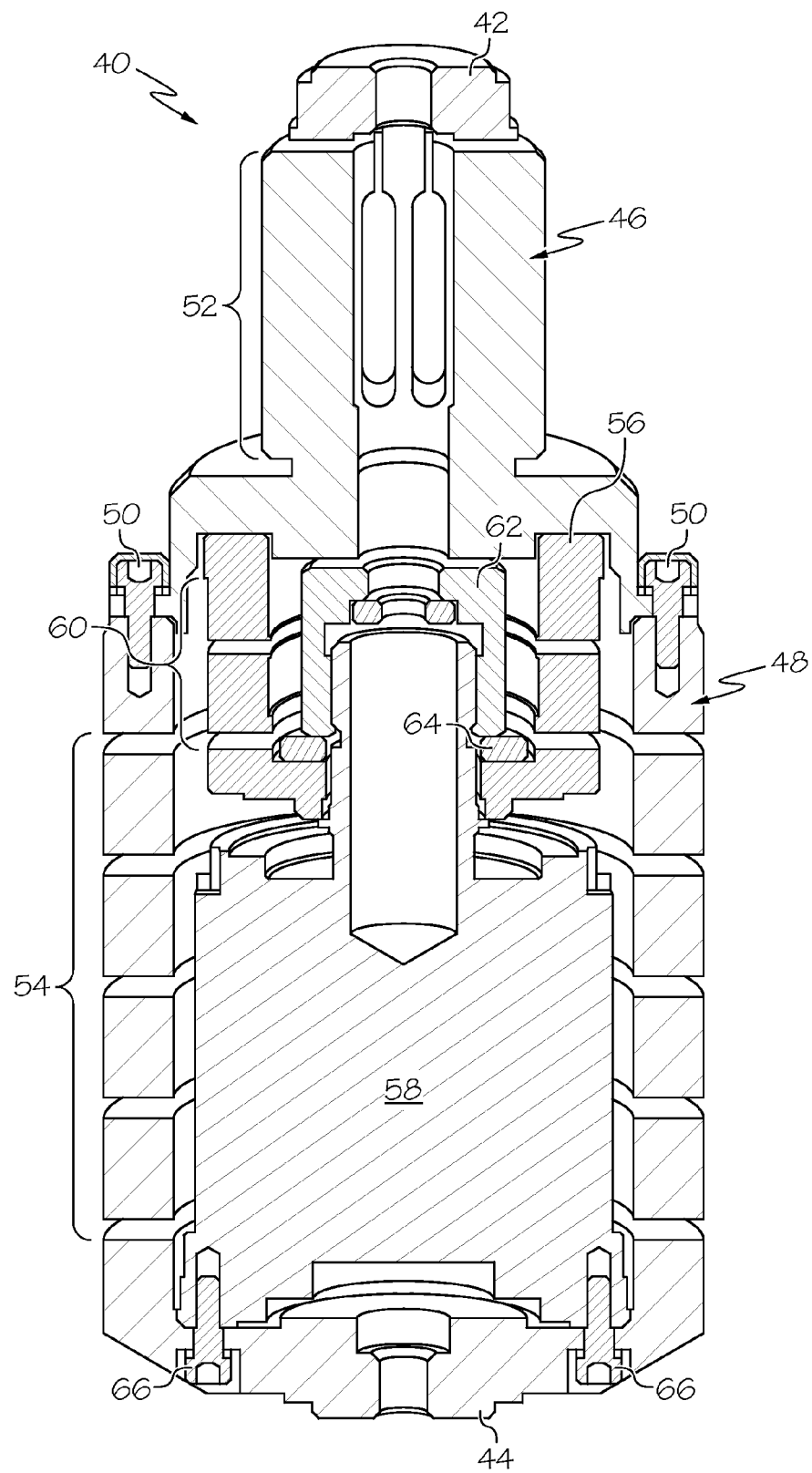
FIG. 4 is cross-sectional view of a multi-parameter isolator that can be utilized as one of the multi-parameter isolators shown in FIG. 3, as illustrated in accordance with an exemplary embodiment of the present invention.

Turning briefly to FIG. 4, a cross-sectional view of an exemplary three parameter isolator 40 is shown. Isolator 40 is suitable for usage as one or all of multi-parameter isolators 12 schematically illustrated in FIG. 3. As indicated in FIG. 4, isolator 40 includes opposing mounting interfaces 42 and 44 (corresponding to interfaces 34 and 36, respectively, in FIG. 3). Mounting interface 42 is formed in an axially-elongated end piece 46, which is joined to a tubular outer body 48 of isolator 40 utilizing a plurality of bolts 50 or other such fasteners. If desired, a blade flexure 52 can be machined into or otherwise formed in end piece 46 to provide a compliancy accommodating mounting misalignments. In further embodiments, other structures, such as a ball or pivot joint, can be provided for this purpose. Mounting interface 44 can be machined into or otherwise formed in the opposite end of tubular outer body 48. A machined main spring 54 is formed in the outer annular sidewall of tubular body 48. Specifically, a number of openings or voids may be cut into or otherwise formed in the annular sidewall of tubular body 48 to define main spring 54. Machined main spring 54 is determinative, wholly or at least in substantial part, of the main spring rate $K_A$ in FIG. 3. In further embodiments, main spring 54 can be replaced by a discrete coil spring, by a gas spring, or may be eliminated altogether.

Isolator 40 further includes an inner structure 56 and a piezoelectric actuator 58, which are nested within an inner cavity or bore provided in outer tubular body 48. A machined tuning spring 60 is cut into or otherwise formed in inner structure 56. Machined tuning spring 60 is wholly or at least predominately determinative of the tuning spring rate $K_B$ schematically identified in FIG. 3. Inner structure 56 and, therefore, tuning spring 60 is coupled between end piece 46 and piezoelectric actuator 58. Specifically, the upper end of inner structure 56 abuts the end portion of end piece 46 joined to tubular body 48. Conversely, the lower end of inner structure 56 is mechanically joined to an axially-extending rod portion of piezoelectric actuator 58 via structural elements 62 and 64 (e.g., a threaded end cap and a washer, respectively). The opposing end of piezoelectric actuator 58 (the lower end of actuator 58 in the orientation shown in FIG. 4) is, in turn, joined to the lower end of tubular body 48 utilizing a number of bolts 66. Although not shown in FIG. 4, a load cell sensor can be further be integrated into or coupled to isolator 40, as described more fully below. For example, in one embodiment, the below-described load cell can be disposed between end piece 46 and the structure to which mounting interface 42 is attached or, instead, positioned between machined main spring 54 and mounting interface 44.

By virtue of the above-described construction, two load paths are provided through isolator 40 between opposing mounting interfaces 42 and 44: (i) a first or outer load path (the $K_A$ load path) extending from mounting interface 42, through tubular body 48 (and therefore through machined main spring 54), and to mounting interface 44; and (ii) a second or inner load path (the $K_B$-PEA load path) extending from mounting interface 42, through inner structure 56 (and therefore through machined tuning spring 60), through piezoelectric actuator 58, and to mounting interface 44. Thus, with the understanding that piezoelectric actuator 58 is controlled to provide the desired damping coefficient $C_A$, isolator 40 can be considered a three parameter isolator wherein a main spring component $K_A$ (primarily determined by main spring 54) is coupled in parallel with a tuning spring component $K_B$ (primarily determined by tuning spring 60) and further coupled in parallel with a damper component $C_A$ (actuator 58), which is coupled in series with the tuning spring component $K_B$. The instant example notwithstanding, it will be appreciated that the particular construction or physical implementation of isolator 40 can vary amongst embodiments, providing that isolator 40 includes a tuning spring coupled in series with a piezoelectric actuator.

Referring once again to FIG. 3, controller 34 is operably coupled to piezoelectric actuators PEAs by control lines 70, which may represent either a physical (hardwire) connections or wireless connections. During operation of vibration isolation system 30, controller 34 varies the control voltages applied to piezoelectric actuators PEAs in response to input signals provided by one or more sensors associated with isolators 32. In preferred embodiments, vibration isolation system 30 includes a first type of sensor coupled to each of isolators 32, which measures the force applied across the PEA-$K_B$ load path and, perhaps, across each isolator 32 generally. For example, vibration isolation system 30 can include a number of load cells 72, which are operably coupled to controller 34 (indicated by dashed lines 74) and which each measure the force applied across a different isolator 32. As indicated in FIG. 3, each load cell 72 can be integrated into a different isolator 32 and disposed between opposing mounting interfaces 34 and 36. In alternative embodiments, load cells 72 can be positioned external to isolators 32 providing that the force applied across isolators 32 can be measured; e.g., in certain embodiments, load cells 72 can be disposed between isolator mounting interfaces 34 and isolated object IO or, instead, between isolator mounting interfaces 36 and platform P.

Vibration isolation system 30 further includes one or more additional sensors, which are directly or indirectly coupled to isolators 32 and configured to measure the relative rate (velocity) or relative displacement across opposing mounting interfaces 34 and 36 of each isolator 32. In certain embodiments, a Linear Variable Differential Transformer (LVDT), non-contacting displacement probes, or other linear displacement sensor can be integrated into or coupled to each isolator 32 and utilized for this purpose. It is preferred, however, that vibration isolation system 30 further includes one or more pairs of accelerometers, which can be utilized to determine the relative rate or velocity (generically, the "relative motion") across opposing mounting interfaces 34 and 36 of each isolator 32. In this case, a separate pair of accelerometers can be associated with each isolator 32 (e.g., integrated into each isolator 32 or affixed near the mounting interfaces 34 and 36 of each isolator) and utilized to measure the relative rate between the isolator mounting interfaces. The accelerometers can be single axis devices having their sense axes aligned to the working axis of their corresponding isolator 32. Alternatively, as indicated in FIG. 3, a first three axis accelerometer 76 can be mounted to isolated object IO, while a second three axis accelerometer 78 is mounted to platform P. Accelerometers 76 and 78 are operably coupled to controller 34 via connections 80 and 82, respectively, which may be wired or wireless (e.g., radio frequency links). In this manner, controller 34 can utilize the signals provided by accelerometers 76 and 78 to determine the relative rate isolated object IO and platform P along any given axis and, therefore, the relative rate between the opposing mounting interfaces 34 and 36 of any given isolator 32 include within system 30. The term "relative motion sensor" is utilized herein to encompass linear displacement sensors, accelerometers sensors, or any other sensors able to measure the relative rate/velocity or relative displacement across the isolator mounting interfaces.

Controller 34 can include any number of hardware, software, and firmware components or modules suitable for performing the functions described herein. Such components can include, but are not limited to, one or more processors, memory, a power source, analog-to-digital and digital-to-analog converters, piezoelectric drivers/amplifiers, and the like. The manner in which controller 34 adjusts the voltage applied to piezoelectric actuators PEAs to achieve the desired damping characteristics will vary amongst embodiments. In certain embodiments, controller 34 can control the voltage applied to piezoelectric actuators PEAs such that actuators PEAs mimic or emulate an ideal fluid-containing, sealed-bellows damper; that is, damping profile of a sealed-bellows damper that is unaffected by thermally-induced fluctuations in damping fluid volume. In this manner, isolators 32 can provide isolation performance similar to that provided by passive three parameter dampers, while avoiding or negating the above-described limitations associated with damping fluid. In further embodiments, controller 34 can modify the damping coefficient ($C_A$) of each multi-parameter isolator 32 to actively tune the frequency at which the isolator provides peak damping; e.g., controller 34 can adjust the piezoelectric-based damping in response the magnitude of vibratory forces detected by accelerometers 76 and 78 to target critical modes as they develop and change over time. In still further embodiments, controller 38 can be configured to vary the control voltages applied to each piezoelectric actuator PEA in accordance with the ideal three parameter transfer function set-forth above (EQ. 1). The control scheme can utilize a feed forward control loop, a feedback control loop, or a combination of the two. An exemplary control architecture suitable for usage in conjunction with controller 38 will now be described in conjunction with FIG. 5.

Figure 5:
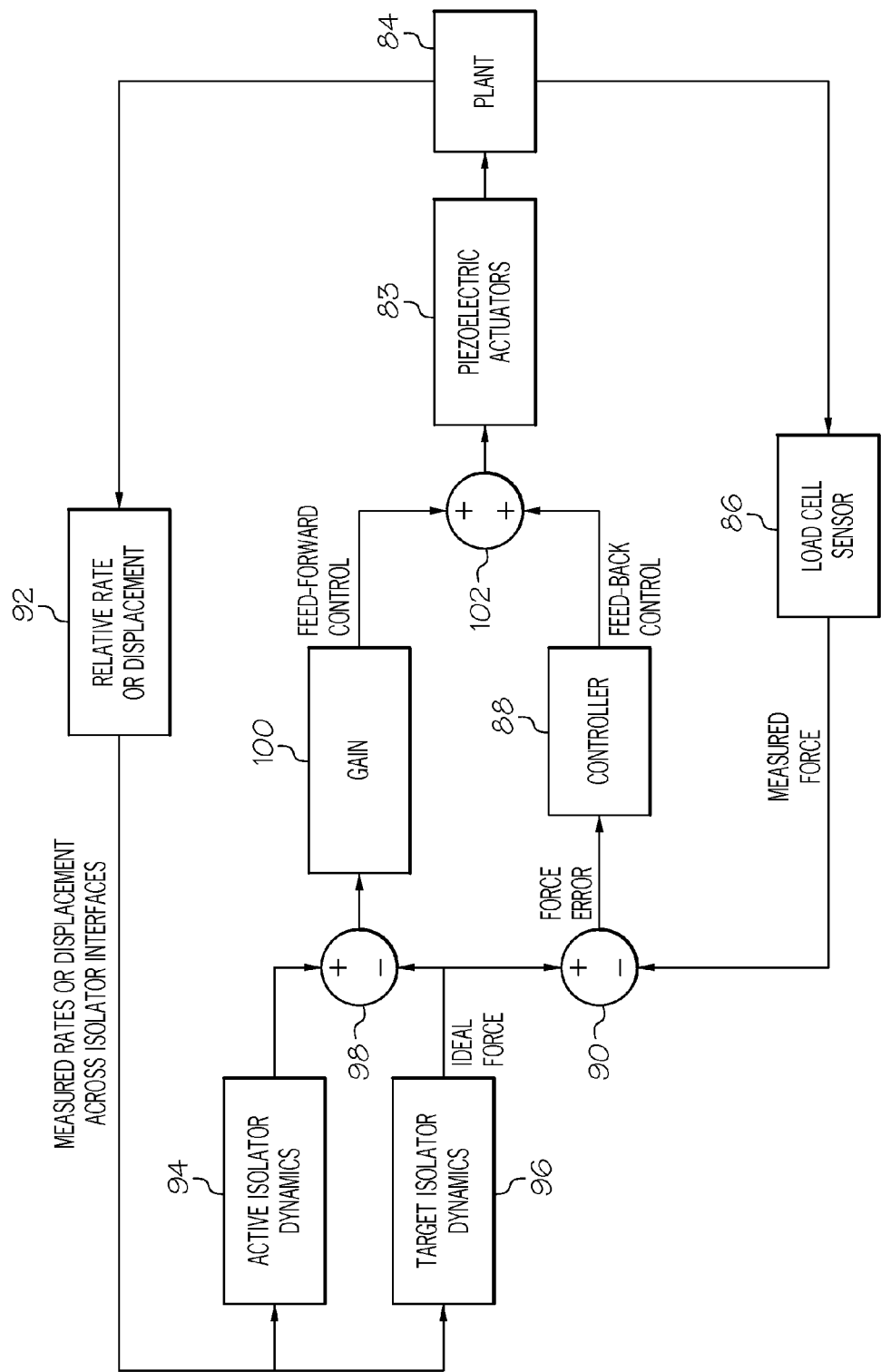
FIG. 5 is block diaphragm of a control architecture that may be utilized by the controller shown in FIG. 3, as illustrated in accordance with an exemplary embodiment of the present invention.

FIG. 5 is a block diagram illustrating a relatively simple control architecture that can be utilized in conjunction with controller 34. In this case, the control architecture includes both feed forward and feedback control loops to help optimize performance and accommodate for any hysteresis associated with the voltage-controlled piezoelectric actuators. The voltage control signal applied to piezoelectric actuators PEA (FIG. 4) is represented in FIG. 5 by BLOCK 83, while BLOCK 84 (PLANT) represents the components on which actuators PEA act; e.g., for each isolator 32, mounting interfaces 34 and 36, load cell 72, the $K_B$ tuning spring, the $K_A$ main spring (if present), and the surrounding structures. Referring collectively to FIGS. 3 and 5, load cells 72 and accelerometers 76 and 78 monitor the performance characteristics of each isolator 32. The data provided by load cells 72 (BLOCK 86, FIG. 5) is applied to an input of controller 38 (BLOCK 88, FIG. 5), which then determines an appropriate control signal to apply to actuator 32. At the same time, the feed-forward control loop supplies controller 38 with a signal indicative of the force required to achieve the desired relative rate across the isolator interfaces. This signal can be compared with the measured force signal at a differential 90 prior to being applied to controller 38. As further indicated in FIG. 5 by the input to BLOCK 92, the signal provided by accelerometers 76 and 78 (a "relative motion signal") is fed into the feed-forward control loop. At BLOCK 94, the relative motion signal is fed into the actual analytical model of the isolator 32 (the active isolator dynamics; BLOCK 94), which is then compared to the desired or target isolator dynamics (BLOCK 96) by differentiator 98. The target isolator or strut dynamics (BLOCK 96) is determined by an analytical model stored in a memory of controller 38 and can be equivalent to or based upon the ideal three parameter transfer function (EQ. 1) described above. The relative gain can then be determined (BLOCK 100) and added to the control voltage signal outputted by controller 38 at summer 102. The voltage control signal, as summed with the feed-forward control signal, is then applied to the piezoelectric actuators PEA to complete the control loop. In further embodiments, the control architecture can be more complex to, for example, provide DC pointing and/or noise suppression functions.

There has thus been provided embodiments of a vibration isolation system including multi-parameter isolators, which provide damping performance comparable to that provided by passive three parameter isolators. Notably, the multi-parameter isolators utilize piezoelectric actuators to provide the desired damping effect and, therefore, do not rely upon fluid-based dampers in preferred embodiments. As damping fluid is eliminated from the isolator, the temperature capabilities of the isolation system are enhanced, the need to compensate for thermally-induced changes in damping fluid volume is avoided, and concerns regarding damping fluid contamination are alleviated. Furthermore, as the piezoelectric actuator are actively controlled, the vibration isolation can adjust its damping capabilities during operation. Consequently, the vibration isolation system can target critical modes as they change over time and/or to can provide different operational modes suited for different environments (e.g., on-launch and in-orbit operation modes). Additionally, in preferred embodiments, the active piezoelectric actuator/damper can be controlled to emulate or mimic the dynamic performance characteristics of a three-parameter fluid damper isolator.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended claims.

What is claimed is:

1. A vibration isolation system, comprising:
   a first isolator, comprising:
      opposing mounting interfaces;
      a tuning spring disposed between the opposing mounting interfaces;
      a piezoelectric actuator disposed between the opposing mounting interfaces and coupled in series with the tuning spring, as taken along a first load path through the first isolator;

a main spring between the opposing mounting interfaces and coupled in parallel with the tuning spring and the piezoelectric actuator; and
an outer tubular body in which the main spring is formed and within which the tuning spring and the piezoelectric actuator are nested; and
a controller coupled to the piezoelectric actuator and, during operation of the isolation system, varying a control voltage supplied to the piezoelectric actuator to dampen vibrations transmitted through the first load path.

2. The vibration isolation system of claim 1 further comprising one or more motion sensors operably coupled to the controller and configured to supply thereto a relative motion signal indicative of the relative motion between the opposing mounting interfaces, and the controller further configured to vary the control voltage supplied to the piezoelectric actuator as a function of the motion signal.

3. The vibration isolation system of claim 2 wherein the one or more motion sensors comprise a displacement sensor configured to measure the displacement between the opposing mounting interfaces, as taken along a working axis of the first isolator.

4. The vibration isolation system of claim 2 wherein the one or more motion sensors comprise first and second accelerometers configured to measure the relative acceleration of the opposing mounting interfaces, as taken along a working axis of the first isolator.

5. The vibration isolation system of claim 1 further comprising a load cell coupled to the controller and configured to supply a load signal thereto indicative of a load through the isolator, the controller varying the control voltage as a function of the load signal.

6. The vibration isolation system of claim 1 wherein the controller is configured to vary the control voltage supplied to the piezoelectric actuator such that the piezoelectric actuator mimics the damping performance of a fluid damper.

7. The vibration isolation system of claim 1 wherein the series spring has a stiffness less at least ten times less the stiffness of the piezoelectric actuator, as taken along the first load path through the first isolator.

8. The vibration isolation system of claim 1 wherein the controller is configured to vary the control voltage supplied to the piezoelectric isolator such that the isolator mimics the performance of a three parameter isolator.

9. The vibration isolation system of claim 1 wherein the controller is configured to vary the control voltage applied to the piezoelectric actuator to provide isolator dynamics based upon the following function:

$$\frac{F}{X_R}(s) = \frac{(K_A + K_B)C_A s + K_A K_B}{C_A s + K_B}$$

wherein F is the force applied across the first load path, $X_R$ is the relative displacement across the opposing mounting interfaces, $K_B$ is determined at least predominately by the tuning spring, and the damping provided by the piezoelectric actuator defines $C_A$.

10. The vibration isolation system of claim 1 further comprising:
at least one sensor configured to provide sensor data indicative of a relative rate or relative displacement across the opposing mounting interfaces;
a feed forward control loop configured to generate a feed forward signal based, at least in part, on the sensor data; and
a feedback control loop in which the controller is included, the controller configured to output a variable control voltage as part of the feedback control loop, the variable control voltage summed with the feed forward control signal and applied to the piezoelectric actuator to complete the feed forward and feedback control loops.

11. A vibration isolation system, comprising:
a first isolator, comprising:
opposing mounting interfaces;
a tuning spring disposed between the opposing mounting interfaces; and
a piezoelectric actuator disposed between the opposing mounting interfaces and coupled in series with the tuning spring, as taken along a first load path through the first isolator;
a first sensor coupled to the first isolator and configured to measure the force applied across the first load path;
one or more additional sensors coupled to the first isolator and configured to measure the relative rate or relative displacement across the opposing mounting interfaces; and
a controller operably coupled to the piezoelectric actuator, to the first second, and to the one or more additional sensors, the controller configured to vary a control voltage supplied to the piezoelectric actuator to provide isolator dynamics based upon the following function:

$$\frac{F}{X_R}(s) = \frac{(K_A + K_B)C_A s + K_A K_B}{C_A s + K_B}$$

wherein F is the force applied across the first load path, $X_R$ is the relative displacement across the opposing mounting interfaces, $K_B$ is determined at least predominately by the tuning spring, and the damping provided by the piezoelectric actuator defines $C_A$.

12. The vibration isolation system of claim 11 wherein the controller is configured to vary the control voltage supplied to the piezoelectric actuator in accordance with a control architecture wherein the relative rate or relative displacement across the opposing mounting interfaces is inputted into a feed-forward control loop, while the force applied across the first load path is inputted into a feed-back control loop.

13. The vibration isolation system of claim 11 wherein the first sensor comprises a load cell contained within the first isolator.

14. The vibration isolation system of claim 13 wherein the load cell is disposed adjacent one of the opposing mounting interfaces.

15. The vibration isolation system of claim 11 wherein first isolator further comprises a main spring disposed between the opposing mounting interfaces and in parallel with the tuning spring and the piezoelectric actuator, the main spring at least predominately determining $K_B$.

16. The vibration isolation system of claim 11 wherein the one or more additional sensors comprise:
a first accelerometer configured to measure acceleration of a first of the opposing mounting interfaces, as taken along a working axis of the isolator; and a second accelerometer configured to measure acceleration of a second of the opposing mounting interfaces, as taken along the working axis.

17. An isolator, comprising:
opposing mounting interfaces;
a tuning spring disposed between the opposing mounting interfaces;
a piezoelectric actuator disposed between the opposing mounting interfaces and coupled in series with the tuning spring, as taken along a first load path through the isolator;
a main spring between the opposing mounting interfaces and coupled in parallel with the tuning spring and the piezoelectric actuator; and
an outer tubular body in which the main spring is formed and within which the tuning spring and the piezoelectric actuator are nested.

18. The isolator of claim 17 wherein the piezoelectric actuator has a stiffness at least 100 times greater than the stiffness of the tuning spring, as taken along the first load path.

19. The isolator of claim 17 further comprising:
a load cell coupled in series with the main spring, the tuning spring, and the piezoelectric actuator.

20. The isolator of claim 17 further comprising an inner structure contained within the outer tubular body, positioned adjacent the piezoelectric actuator, and in which the tuning spring is formed.

* * * * *